S. E. OVIATT.
Thrashing Machine.
No. 84,706.
Patented Dec. 8, 1868.
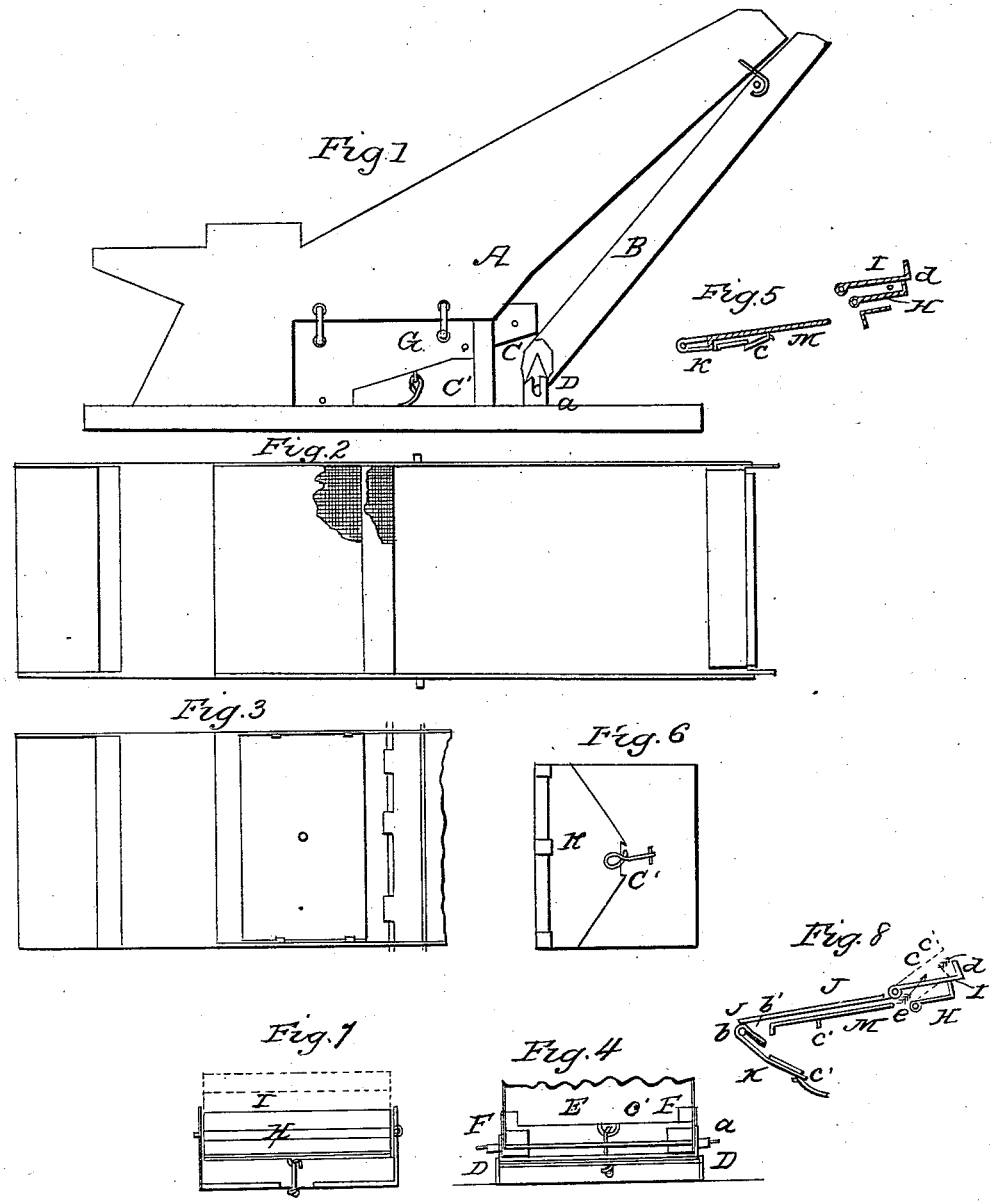

S. E. OVIATT, OF RICHFIELD, OHIO.

Letters Patent No. 84,706, dated December 8, 1868.

IMPROVEMENT IN THRESHING-MACHINES.

The Schedule referred to in these Letters Patent and making part of the same.

*To all whom it may concern:*

Be it known that I, S. E. OVIATT, of Richfield, in the county of Summit, and State of Ohio, have invented certain new and useful Improvements in Threshing-Machines; and I do hereby declare that the following is a full and complete description of the same, reference being had to the accompanying drawings, making part of this specification, in which—

Figure 1 is a side view of the machine.
Figure 2 is a top view.
Figure 3 is a section view.
Figures 4, 5, 6, 7, and 8 are detached sections.
Like letters of reference refer to like parts in the different views.

A, fig. 1, represents the frame of the machine.

B, the stacker, to the lower end of which is attached the metallic bracket C.

These brackets are provided with the hollow journals $a$, figs. 1 and 4, which are supported in the rest D of the frame.

These journals form bearings for the shaft E of the carrier-rollers F, fig. 4, which rotate the apron or carrier G.

Fig. 1 represents the shoe, which is hung in the frame A. To this shoe is hinged the tail-board H, and screw I, fig. 8.

J is a screw, for a purpose hereafter shown, and may be detached from the shoe or not, as desired.

K is a chute, hinged to the shoe at $b$, and

L is a cut-off, attached to the apron M.

This machine is to be provided with the ordinary cylinder for threshing, fanning-apparatus, and carrier, as the improvement consists in the arrangement for screening the grain, and conducting the same from the thresher.

The manner in which it operates is as follows:

The grain is run through the thresher, and thrown, by the motion of the cylinder, upon the carrier, in the ordinary way, which carries away the straw, the grain dropping through and taken to the sieves of the shoe G, which shoe is kept vibrating by any desirable means, the fanning-apparatus blowing the chaff and light substances through to the stacker B, whence it is carried off with the straw, the grain being shaken down on the apron and chute K, which is secured, as shown in fig. 5, and from thence over the point $b$ into any receptacle provided for that purpose.

In threshing the lighter grains, the wind from the fan may have a tendency to carry away the grain with the chaff and straw. In order to prevent this, the perforated tail-screen I and tail-board H may be elevated, as shown by the dotted lines $c$, fig. 8, and the current of air throwing the chaff against the ledge $d$, all the grain will be precipitated through the tail-screen I, on the tail-board H, and the chaff be taken up by the current, and carried out over the tail-ledge $d$.

Thus is a continual current of air passing through the space $e$, and out through the tail-board I, as indicated by the arrows, thus preventing waste of grain, and carrying off the chaff.

When desired that the grain be very clean, for special purposes, the screen J is placed, as shown, above the apron M, the chute K being lowered, as shown in fig. 8. The vibrating motion of the shoe sifts the foreign seeds and other substances through to the apron M, and thence down to the chute K, where they are conveyed from the thresher, the clean grain passing over on the screen to a receptacle prepared for that purpose.

The chute is hinged to the frame at $b$, and may be lowered or raised, as the case may demand. When raised, the piece $b'$ forms a continuation of the apron M, over which the grain passes in its descent from the thresher. It is secured in this position by the fastenings $c'$, and when lowered, is used for conveying away the foreign seeds that sift through the screen. It more effectually cleans the grain, as it gives more surface to the action of the fan.

What I claim as my improvement, and desire to secure by Letters Patent, is—

1. The metallic bracket C, when attached to and forming a support for the lower end of the stacker B, and having its pivot or journal $a$ hollow, forming a box or bearing for the carrier-shaft E.

2. The metallic bracket C, so connected with the stacker B and frame of the thresher as to form a pivot and support for the lower end of the stacker, substantially as set forth.

3. The hinged tail-board H and tail-screen I, in combination with the shoe G of the thresher, substantially as and for the purpose set forth.

4. The hinged chute K, cut-off L, and shoe G, arranged in the manner and for the purpose as set forth.

S. E. OVIATT.

Witnesses:
W. H. BURRIDGE,
E. E. WAITE.